(12) United States Patent
Kuo et al.

(10) Patent No.: US 8,102,315 B2
(45) Date of Patent: Jan. 24, 2012

(54) ALGORITHM OF COLLECTING AND CONSTRUCTING TRAINING LOCATION DATA IN A POSITIONING SYSTEM AND THE POSITIONING METHOD THEREFOR

(75) Inventors: Sheng-Po Kuo, Taipei (TW); Yu-Chee Tseng, Hsinchu (TW); Yueh-Feng Lee, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 256 days.

(21) Appl. No.: 12/566,843

(22) Filed: Sep. 25, 2009

(65) Prior Publication Data

US 2010/0127933 A1 May 27, 2010

(30) Foreign Application Priority Data

Nov. 27, 2008 (TW) ................ 97145862 A

(51) Int. Cl.
*G01S 3/02* (2006.01)
(52) U.S. Cl. .......................................... 342/451
(58) Field of Classification Search ............ 342/451
See application file for complete search history.

(56) References Cited

U.S. PATENT DOCUMENTS

| | | | |
|---|---|---|---|
| 6,992,625 B1 | 1/2006 | Krumm et al. | |
| 7,233,286 B2 | 6/2007 | Krumm et al. | |
| 2004/0072577 A1 | 4/2004 | Myllymaki et al. | |
| 2007/0133487 A1 | 6/2007 | Wang et al. | |
| 2007/0139269 A1* | 6/2007 | Chen et al. | 342/450 |
| 2009/0204597 A1* | 8/2009 | Mani et al. | 707/5 |

FOREIGN PATENT DOCUMENTS

| | | |
|---|---|---|
| CN | 101173980 | 5/2008 |
| WO | 02054813 | 7/2002 |

OTHER PUBLICATIONS

B. Li, Y. Wang, H.K. Lee, Methods for yielding a database of location fingerprints in WLAN, IEE 20050078, p. 580-584, Oct. 2005.*
State Intellectual Property Office of the People's Republic of China, "Office Action", Aug. 30, 2011, China.
Youssef, M.A., Agrawala, A, and Udaya Shankar A., "WLAN location determination via clustering and probability distributions", 2003, IEEE PERCOM.
Jeffrey Junfeng Pan, James T. Kwok, Qiang Yang, and Yiqiang Chen, "Multidimensional Vector Regression for Accurate and Low-Cost Location Estimation in Pervasive Computing", Sep. 2006, IEEE Transations on Knowledge and Data Engineering.
Kuo et al., "Cluster-Enhanced Techniques for Pattern-Matching Localization Systems", 2007, IEEE Internatonal Conference on Mobile Adhoc and Sensor Systems.

\* cited by examiner

*Primary Examiner* — Harry Liu
(74) *Attorney, Agent, or Firm* — WPAT, P.C.; Justin King

(57) ABSTRACT

An algorithm of collecting and constructing training location data is provided as it is applied to a test space of a plurality of beacons and training locations. The signal patterns of beacons adjacent to each training location are detected. The signal pattern is converted into a signal vector and each signal vector is integrated for calculating a feature vector of each training location. The coordinate and the feature vector of each training location, after being recorded, are introduced into a numerical data fitting model for constructing the signal pattern function of each beacon. For positioning, the current signal patterns of the beacons adjacent to the user location are detected and converted to a discriminant function. Thereafter, the minimum of the discriminant function is computed so as to find the position of the user location.

31 Claims, 13 Drawing Sheets specifying a position to be detected and then detecting the signal strengths of beacons among the plural beacons that are adjacent and related to the detected position so as to convert the same into a comparison signal vector — S210 constructing a discriminant function basing upon the coordinates of the plural beacons, the comparison signal vector and the signal strength functions of the plural beacons — S220 using a numerical optimization search technique to find the minimum of the discriminant function so as to define the location relating to the minimum of the discriminant function as the coordinate of the detected position in the test signal space — S230

FIG. 4B detecting at each training location the signal strengths of beacons among the plural beacons that are adjacent thereto for converting the same into signal vectors relating to each training location while integrating the signal vectors of each training location so as to calculate a feature vector for each training location — S510 recording the coordinate of each training location and its corresponding feature vector and the gradient information — S520 using the coordinates of each training location and the corresponding feature vectors as well as the corresponding gradient information to construct a spatial-correlated data structure — S530

FIG. 6A

ALGORITHM OF COLLECTING AND CONSTRUCTING TRAINING LOCATION DATA IN A POSITIONING SYSTEM AND THE POSITIONING METHOD THEREFOR

TECHNICAL FIELD

The disclosure relates to an algorithm of collecting and constructing training data in a positioning system and the positioning method using the same.

BACKGROUND

FIG. 1 shows a diagram of a conventional localization system based on the pattern-matching algorithm, which is disclosed in "RADAR An In-Building RF-based User Location and Tracking System", by P. Bahl and V. N. Padmanabhan from pages 775-784, IEEE INFOCOM at 2000s. The positioning system using RADAR includes two phases, which are a training phase and a positioning phase.

In the training phase of the aforesaid RADAR location and tracking system, a plurality of training locations $\mathcal{L}=\{\ell_1, \ldots, \ell_m\}$ are specified as their coordinates in a Cartesian coordinate system defining a training area are given and thus known, which are $\lambda_1=<x_1,y_1>$, $\lambda_2=<x_2,y_2>$, $\lambda_3=<x_3,y_3>$, ..., $\lambda_m=<x_m,y_m>$. It is noted that there can be a plurality of beacons, i.e. $B=\{b_1, \ldots, b_n\}$, located in the neighborhood of each training location for enabling the signals emitted from those neighboring beacons to be receivable by such training location so that a sample containing signal strength information for that specific training location can be formed regarding to those neighboring beacons. Thereby, there can be a plurality of samples being formed in correspondence to the plural training locations in a manner that the feature vector $v_i=[v_{i,1}, v_{i,2}, \ldots, v_{i,n}]$ of each training location can be established, wherein $v_{i,j}$, $j=1 \ldots n$ is the average signal strength of the beacon $b_j$ for the training location $\lambda_i$. Consequently, all those established feature vectors along with their paired training locations are registered and thus form a database.

In the positioning phase, the object to be positioned is configured with a wireless receiver for enabling the same to receive signals from its neighboring beacons in a real time manner. Accordingly, the received signal strengths (RSS) are used to form a signal strength fingerprint, i.e. $s=[s_1, s_2, \ldots, s_n]$, which is then compared with those information stored in the aforesaid database for finding a training location with the most similar feature vector and thereby locating the position of the object. Operationally, the system defined the differences between the real-time signal strength fingerprint of the object with those feature vectors as a function h, and thus the comparison performed for positioning the object can be represented by a discrete function h: $\mathcal{L} \rightarrow R^+$. Consequently, the object is to find a training location that can minimize the value of the function h. For instance, when the similarity function h is defined as the Euclidean Distance between two vectors, and there are three training locations $\lambda_1, \lambda_2, \lambda_3$ and two beacons being located in a test signal space, the three Euclidean Distances between the three training locations and a test object can be computed and thereafter the position of the one training location with the minimum Euclidean Distance is selected to be the location of the test object.

SUMMARY

An exemplary embodiment of an algorithm of collecting and constructing training location data in a positioning system and a positioning method is disclosed. The disclosed embodiments applies to a test signal space of a plurality of beacons and a plurality of training locations. An exemplary embodiment comprising: detecting signal strengths of beacons adjacent to each training location for converting the same into signal vectors for each training location; integrating the signal vectors of each training location respectively so as to calculate a feature vector of each training location; recording the coordinate of each training location and the corresponding feature vector; introducing the coordinate and the feature vector of each training location into a numerical data fitting model so as to construct a signal strength function for each beacon.

Further scope of applicability of the disclosure will become more apparent from the detailed description given hereinafter. However, it should be understood that the detailed description and specific examples, while indicating embodiments, are given by way of illustration only, since various changes and modifications within the spirit and scope of the invention will become apparent to those skilled in the art from this detailed description.

BRIEF DESCRIPTION OF THE DRAWINGS

The disclosed embodiments will become more fully understood from the detailed description given herein below and the accompanying drawings which are given by way of illustration only, and thus are not limitative of the invention and wherein:

FIG. 4B is a flow chart depicting the steps of locating a test object for the positioning method of FIG. 4A.

FIG. 6A is a flow chart depicting the steps of collecting and constructing training location data for a positioning method according to a third embodiment.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
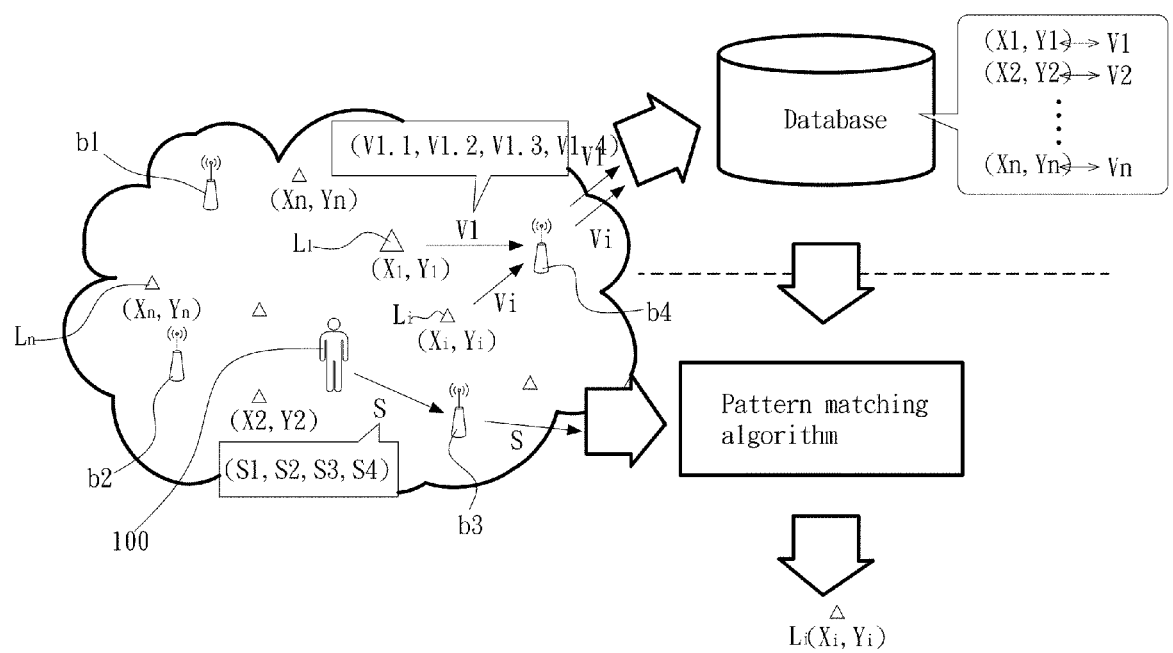
FIG. 1 shows a diagram of a conventional localization system based on pattern-matching algorithm.
Figure 2A:
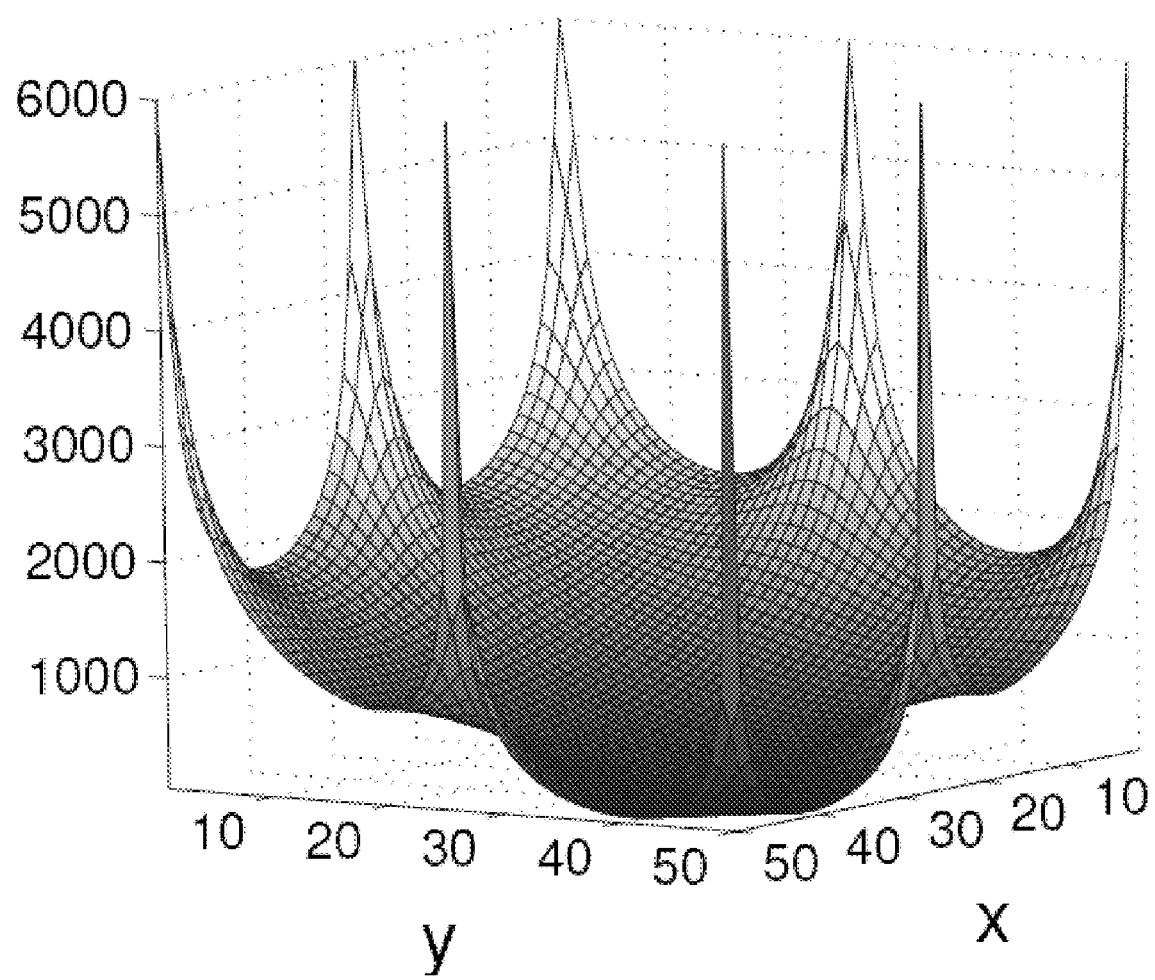
FIG. 2A and FIG. 2B show the distribution of values of a similarity function $h(l_i)$ in a test signal space of 50×50 grid as there are eight beacons located at the perimeter of the test signal space and 625 training locations evenly distributed inside the test signal space for performing a similarity comparison against an object located at the position (42, 42).
Figure 2B:
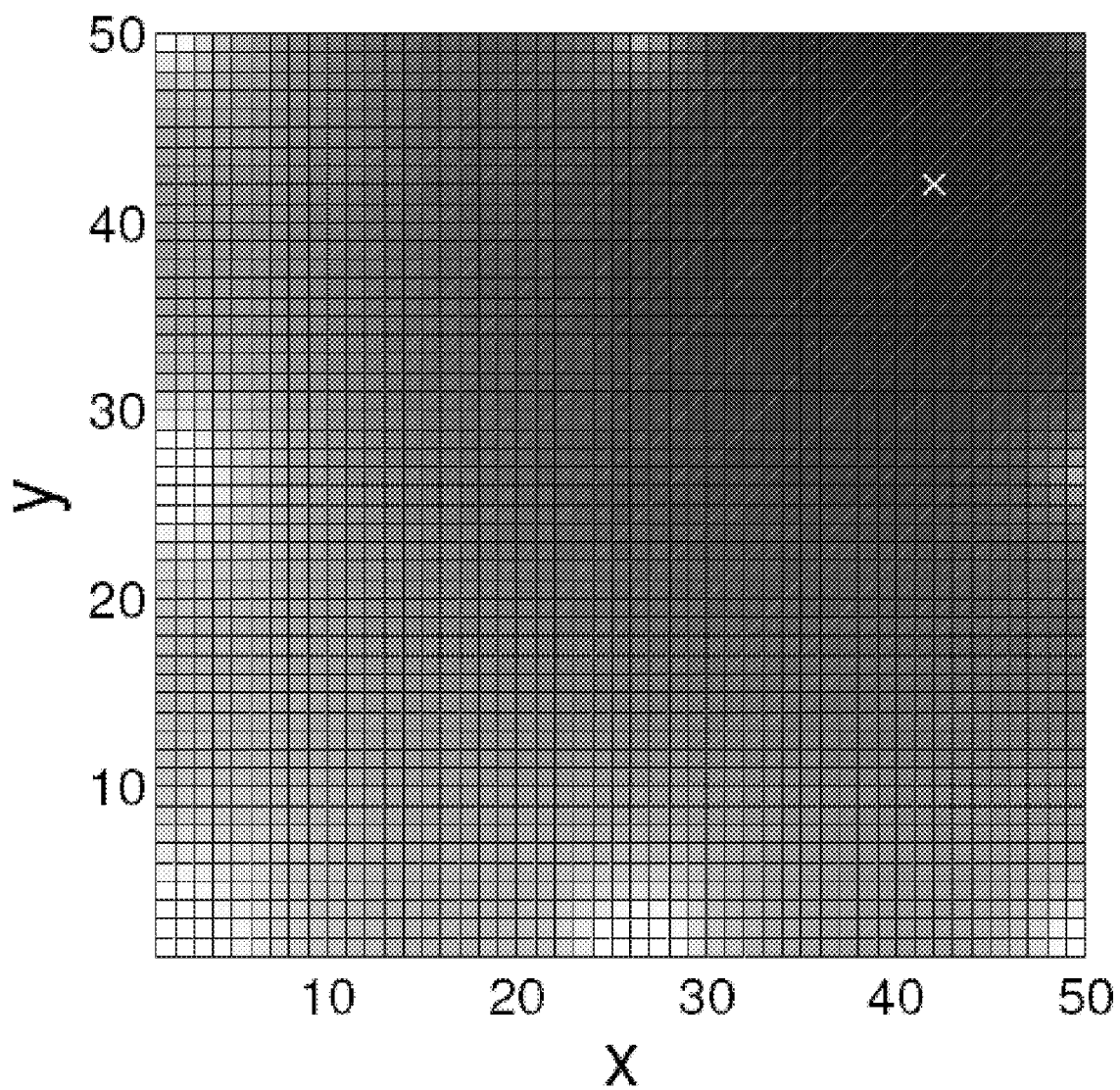

The method of collecting and constructing training location data in a positioning system is designed to use the spatial correlation between training locations in a test signal space to speed up the search for positioning. Please refer to FIG. 2A and FIG. 2B, which show the distribution of values of a similarity function $h(\lambda_i)$ in a test signal space of 50×50 grid as there are eight beacons located at the perimeter of the test signal space and 625 training locations evenly distributed inside the test signal space for performing a similarity comparison against the signal pattern received by an object located at the position (42, 42).

As soon as the signal detector placed at the position (42, 42) of the test signal space successfully collect a comparison signal vector s, the $h(\lambda_i)$ of those training locations can be calculated and thus obtained. From the calculation resulting from the $h(\lambda_i)$, it is concluded that the closer a training location is to the signal detector placed at the position (42, 42) as the position marked by x in FIG. 2B, the smaller the value of its $h(\lambda_i)$ will be. Thereby, the positioning system is able to located the exact location of the signal detector, which is acting as an object to be located, by following the descending of the $h(\lambda_i)$.

According to the abovementioned concept, an positioning algorithm can be constructed. When a set of training locations $\mathcal{L}$ with their corresponding feature vectors and a comparison signal vector are provided, a continuous differentiable discriminant function $f: \mathcal{F} \rightarrow R^+$ can be established while achieving $f(\lambda_i) \approx h(\lambda_i)$ for each training location. It is noted that the gradient of the discriminant function $f$ can adequately demonstrate the spatial correlation among training locations, and thus by finding the minimum of the discriminant function $f$, the exhausting calculations of $h(\lambda_i)$ for each an every training location can be avoided.

Figure 3:
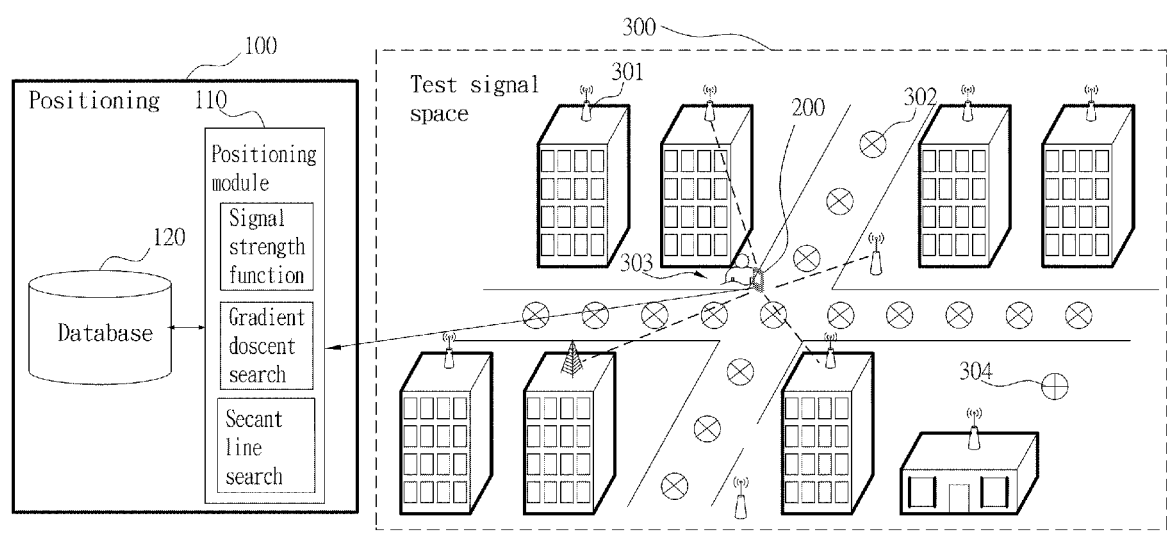
FIG. 3 is a schematic diagram showing a positioning system according to an embodiment.

Please refer to FIG. 3, which is a schematic diagram showing a positioning system according to an embodiment. The positioning system comprises at least a signal detector 200 and a positioning mainframe 100 that is applicable in a test signal space 300. There are a plurality of beacons 301 randomly distributed inside the test signal space 300 as well as there are a plurality of training locations 302 of known coordinates in the test signal space 300, whereas the beacons can be access points (APs). The positioning mainframe 100 is designed to collect and construct training location data while using the same to perform a positioning calculation by the use of a position module 110 and a database 120 configured therein. Each signal detector 200 is designed to receive RF signals from those beacons with the ability to evaluate the signal strength of the received signals, and is able to exchange information with the positioning mainframe 100 as it is wirelessly connected with the same.

In one embodiment, the collecting of training location data could be performed by the following steps: detecting at each training location the signal strengths of beacons among the plural beacons that are adjacent thereto for converting the same into signal vectors relating to each training location while integrating the signal vectors of each training location so as to calculate a feature vector for each training location; recording the coordinate of each training location and the corresponding feature vector; and introducing the coordinate and the feature vector of each training location into a numerical data fitting model so as to construct a signal strength function for each beacon representing the signal strength distribution of each beacon in the test signal space.

In one embodiment, the positioning of the a position to be detected could be performed by the following steps: specifying a position to be detected and then detecting the signal strengths of beacons among the plural beacons that are adjacent and related to the detected position so as to convert the same into a comparison signal vector; constructing a discriminant function basing upon the comparison signal vector and the signal strength functions of the plural beacons; and using a numerical optimization search technique to find the minimum of the discriminant function so as to define the location relating to the minimum of the discriminant function as the coordinate of the detected position in the test signal space.

The numerical data fitting model can be established by a path loss procedure, by a regression procedure, or by an interpolation procedure, or even by a combined calculation including procedures selected from the group consisting of: a path loss procedure, a regression procedure and an interpolation procedure. Nevertheless, the operation steps for the path loss model, the regression model and the interpolation model are not the same, which will be described respectively hereinafter.

Figure 4A:
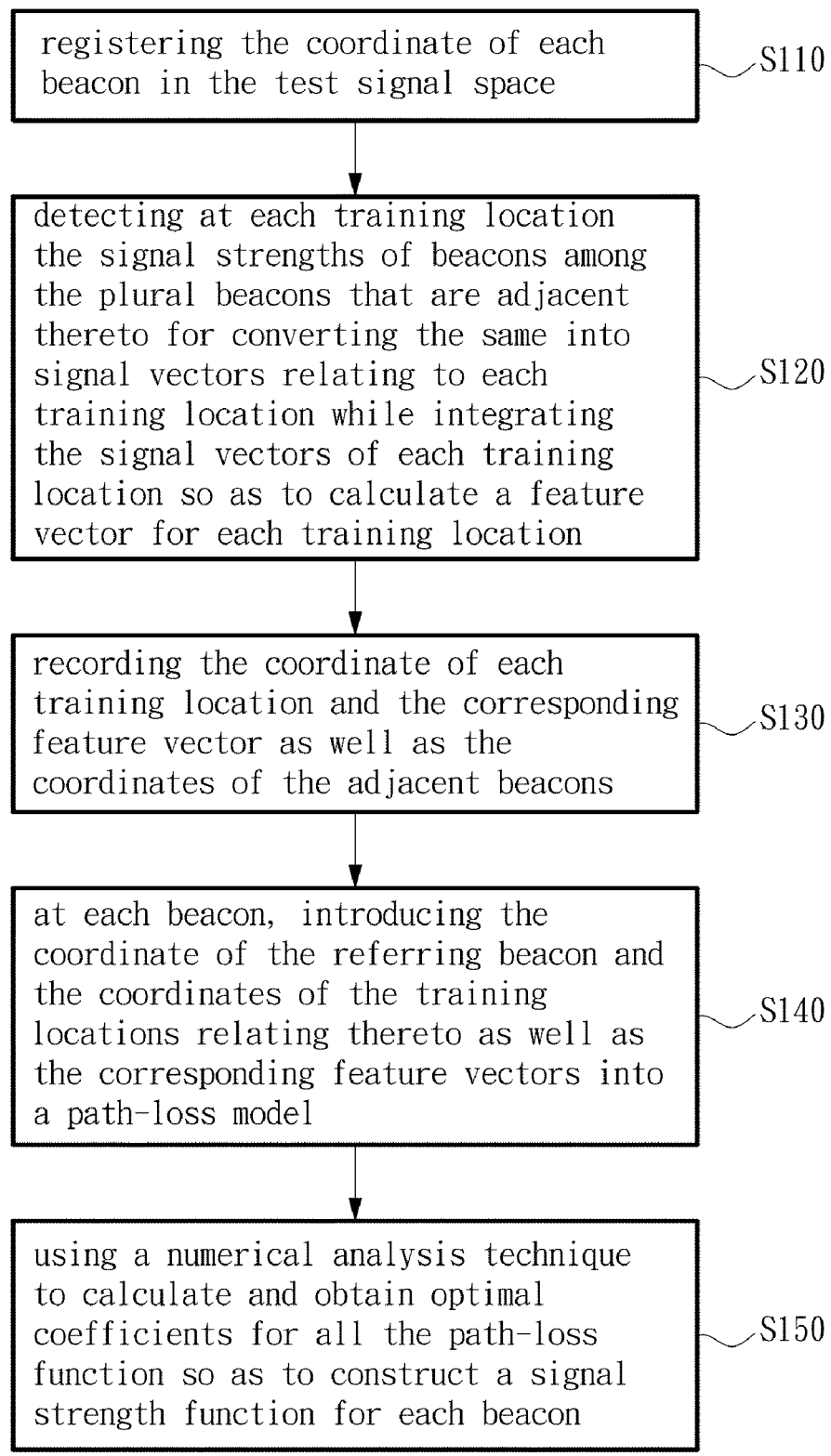
FIG. 4A is a flow chart depicting the steps of collecting and constructing training location data for a positioning method according to a first embodiment.

Please refer to FIG. 4A, which is a flow chart depicting the steps of collecting and constructing training location data for a positioning method according to a first embodiment. The method of FIG. 4A which uses a path loss algorithm and a steepest descent search algorithm and is adapted for a test signal space similar to the one shown in FIG. 3, starts from the step S110.

At step S110, the coordinate of each beacon 301 in the test signal space 300 is registered for enabling a positioning module to calculate the Euclidean Distances between any random location and its adjacent beacons as those Euclidean Distances are required in the calculation of a path loss process; and then the flow proceeds to step S120.

At step S120, at each training location, the signal strengths of beacons among the plural beacons that are adjacent thereto are detected and then being converted into signal vectors relating to each training location, and then the signal vectors are integrated so as to calculate a feature vector for each training location; and then the flow proceeds to step S130.

Moreover, in the step S120, the plural training locations 302 $\mathcal{L}=\{\ell_1, \ldots, \ell_m\}$ should be specified in advance as their coordinates in a Cartesian coordinate system defining the test signal space are given and thus known, which are $\lambda_1=<x_1,y_1>$, $\lambda_2=<x_2,y_2>$, $\lambda_3=<x_3,y_3>$, ..., $\lambda_m=<x_m,y_m>$. It is noted that there can be a plurality of beacons 301, i.e. $B=\{b_1, \ldots, b_n\}$, located in the neighborhood of each training location 302 for enabling the signals emitted from those neighboring beacons to be receivable by the signal detector 200 placed at such training location so that a sample containing signal strength information for that specific training location can be formed regarding to those neighboring beacons in a manner that each adjacent beacon 301 regarding to that specific training location will be responsible for one signal strength data which is then being converted into a signal vector and thereafter transmitted to the positioning mainframe 100.

Then, the positioning mainframe 100 will use a positioning module 110 to integrate all the signal vectors relating to the referring training location to form a feature vector, and consequently, for the plural training locations, there can be a plurality of feature vectors $v_i=[v_{i,1}, v_{i,2}, \ldots, v_{i,n}]$ to be established, as $v_{i,j}$, $j=1 \ldots n$ is the average signal strength of the beacon $b_j$ for the training location $\lambda_i$. Consequently, all those established feature vectors along with the coordinates of their paired training locations 302 and beacons 301 are registered and thus form a database 120 in the positioning mainframe, as shown in the step S130 which is followed by step S140.

At step S140, at each beacon, the coordinate of the referring beacon and the coordinates of the training locations relating thereto as well as the corresponding feature vectors into a path-loss model; and then the flow proceeds to step S150. At step S150, a numerical analysis technique is used to calculate and obtain optimal coefficients for the path-loss function so as to construct a signal strength function for each beacon.

It is noted that the Log-Distance path loss model for open space is as following:

$$PL(d) = PL(d_0) + 10\phi \log\left(\frac{d}{d_0}\right) \quad (1)$$

wherein, d is the distance between each beacon 301 and any random location 304 in the test signal space;

$d_0$ is a reference distance unit; and $\phi$ is an environment variable, which can be ranged between 2 and 6 under normal condition.

Accord to the aforesaid path loss model, the signal strength function relating to the signal strength received at a random location $\lambda_i$ from the beacon $b_j$ can be represented as following:

$$P_r(\lambda, b_j) = P_t - PL(\|\lambda, b_j\|) = P_{ref} - 10\phi \log(\|\lambda, b_j\|) \quad (2)$$

wherein, $b_j$ represents the $j^{th}$ beacon 301 as j=1, ..., n;

$\lambda$ represents any location 304 in the test signal space 300;

$P_t$ represents the initial signal strength of any beacon 301;

$P_{ref} = P_t - PL(d_0)$ represents a reference signal strength;

$(\|\lambda, b_j\|)$ is the Euclidean Distance measured between the location l and the beacon $b_j$; and $\phi$ and $P_{ref}$ are system parameters in the test signal space 300.

However, as the environment-related $\phi$ and the hardware-related $P_{ref}$ are only supposed values that are unknown system parameters, so that they should be estimated in advance by using the data relating to the training locations 302.

By defining the optimal system parameter of the beacon $b_j$ as $x = [P_{ref}^j, \phi_j]^T$, for each training location, the relationship between the corresponding feature vector and the gradient information is represented as following:

$$Ax = c;$$

$$A = \begin{bmatrix} 1 & -10\log(\|l_1, b_j\|) \\ M & M \\ 1 & -10\log(\|l_m, b_j\|) \end{bmatrix}$$

wherein, $$x = \begin{bmatrix} P_{ref}^j \\ \phi_j \end{bmatrix}$$

$$c = \begin{bmatrix} v_{1,j} \\ M \\ v_{m,j} \end{bmatrix}.$$

Accordingly, a least-squares analysis is used for calculating the optimal coefficient relating to the beacon $b_j$ as following:

$$x = [P_{ref}^j, \phi_j]^T = (A^T A)^{-1} A^T C. \quad (3)$$

The so-obtained $\phi_j$ and $P_{ref}^j$ will minimize the difference between the signal strength predicted by the path loss model with the actual feature vectors of the training locations of the beacon $b_j$ so that the $\phi_j$ and $P_{ref}^j$ can be considered as known system parameters by the positioning system. By introducing the coordinates of all the beacons 301 and the optimal system coefficient respectively into the aforesaid path loss model, the signal strength function relating to the signal strength received at a random location $l_i$ from the beacon $b_j$ can be represented as the aforesaid formula (2), so that the collecting and constructing training location data, generally referring as the training phase, for a positioning method according to the first embodiment is completed.

Please refer to FIG. 4B, which is a flow chart depicting the steps of locating a test object for the positioning method of FIG. 4A. The localization process use the signal strength function of FIG. 4A to locate the position of the test object as the test object is the aforesaid signal detector 200. The flow of FIG. 4B starts from the step S210.

At step S210, a position to be detected 303 is specified at which the signal strengths of beacons 301 among the plural beacons 301 that are adjacent the detected position are detected and then convert into a comparison signal vector; and then the flow proceeds to step S220. In an embodiment, the signal detector 200 is placed at the detected position 303 in the test signal space 300 for enabling the same to receive signal from the adjacent beacons 301 while integrating the signal strength of the received signal into a comparison signal vector $s = [s_1, s_2, \ldots, s_n]$.

At step S220, a discriminant function is constructed basing upon the coordinates of the plural beacons, the comparison signal vector and the signal strength functions of the plural beacons; and then the flow proceeds to step S230. The discriminant function is represented as following:

$$f(s, \lambda) = \sum_{j=1}^{n} (s_j - P_r(\lambda, b_j))^2 \quad (4)$$

in which, $\lambda$ represents any location in the test signal space;

$s = [s_1, s_2, \ldots, s_n]$ is the comparison signal vector;

$b_j$ represents the $j^{th}$ beacon as j=1, ..., n;

$P_r(\lambda, b_j)$ is the signal strength function of the beacon $b_j$

At step S230, a numerical optimization search technique is used to find the minimum of the discriminant function $f$ so as to define the location relating to the minimum of the discriminant function $f$ as the coordinate of the detected position 303 in the test signal space 300. It is noted that the numerical optimization search technique used for searching the minimum of the discriminant function is a combined procedure of a steepest descent search process and a secant line search process.

During the search in the step S230, the positioning module 110 employs a gradient descent search process to minimize the discriminant function $f$ to its minimum. The gradient descent search process is a recursive search process that can be represented as following:

$$\ell^{(k+1)} = \ell^{(k)} + \alpha_k d^{(k)}, \quad (5)$$

wherein, $\ell^{(k+1)}$, $\ell^{(k)}$ and $d^{(k)}$ are two-dimensional vectors;

$\alpha_k$ is a scalar.

The recursive process starts by randomly selecting an initial position $\ell^{(0)}$. Then, for the following k recursive steps as $k \geq 1$, the process must determine a search direction, i.e. $d^{(k)}$, for each recursive step and a progress distance, i.e. $\alpha_k$, relating to each recursive step as well. The recursive will only be stopped when it reaches or almost reaches a position relating to the minimum of the discriminant function $f$. It is noted that when any one of the following two conditions is satisfied, the recursive is stopped, which are: (1) when the advance of two successive searches is smaller than a standard value $\Delta\ell_{min}$, i.e. when $\|\ell^{(k+1)}-\ell^{(k)}\|<\Delta\ell_{min}$; (2) when the times of recursive search reach a defined limit $k_{max}$, i.e. $k=k_{max}$.

As soon as the gradient descent search process is stopped, the stop position is the optimal solution of the target discriminant function $f$. Nevertheless, the $d^{(k)}$ and $\alpha_k$ are determined by the use of a steepest descent search procedure. Since the direction for maximizing the function $f(\ell^{(k)})$ is $$\nabla f(\ell^{(k)}) \left[ \frac{\partial f(\ell^{(k)})}{\partial x}, \frac{\partial f(\ell^{(k)})}{\partial y} \right],$$

the value of the target discriminant function $f$ can be decreased progressively when $d^{(k)}=\nabla f(\ell^{(k)})$ and therefore the abovementioned formula (5) can be transformed as following:

$$\ell^{(k+1)}=\ell^{(k)}-\alpha_k \nabla f(\ell^{(k)}). \tag{6}$$

Therefore, by differentiate the discriminant function $f$, the search direction, i.e. $d^{(k)}$, for each recursive step relating to a random position 304, i.e. $\ell^{(k)}$ can be calculated as following:

$$\frac{\partial}{\partial x} f(\ell^{(k)}) = (-2)\sum_{j=1}^{n} (s_j - P_r(\ell^{(k)}, b_j)) \frac{\partial}{\partial x} P_r(\ell^{(k)}, b_j) \tag{7}$$

$$= 20\sum_{j=1}^{n} \phi_j (s_j - P_r(\ell^{(k)}, b_j)) \frac{\partial}{\partial x} \log(\|\ell^{(k)}, b_j\|),$$

$$\frac{\partial}{\partial y} f(\ell^{(k)}) = (-2)\sum_{j=1}^{n} (s_j - P_r(\ell^{(k)}, b_j)) \frac{\partial}{\partial y} P_r(\ell^{(k)}, b_j) \tag{8}$$

$$= 20\sum_{j=1}^{n} \phi_j (s_j - P_r(\ell^{(k)}, b_j)) \frac{\partial}{\partial y} \log(\|\ell^{(k)}, b_j\|).$$

Assuming the current gradient at the random position 304 is $\nabla f(\ell)$, the positioning module 110 is able to calculated $f(\ell-\beta\nabla f(\ell))$ as following:

$$f(\ell^{(k)} - \beta \nabla f(\ell^{(k)})) = \sum_{j=1}^{n} (s_j - P_r(\ell^{(k)} - \beta \nabla f(\ell^{(k)}), b_j))^2, \tag{9}$$

$$= \sum_{j=1}^{n} (s_j - P_{ref}^j + 10\phi_j \log(\|\ell^{(k)} - \beta \nabla f(\ell^{(k)}), b_j\|))^2,$$

$$= \sum_{j=1}^{n} \Theta_j^2.$$

Thereafter, the positioning module 110 will use a secant line search process to obtain a convergence value of $\beta$, whereas the formula of the secant line search process can be represented as following:

$$\beta_{t+1} = \beta_t - \frac{\beta_t - \beta_{t-1}}{G'_k(\beta_t) - G'_k(\beta_{t-1})} G'_k(\beta_t), \tag{10}$$

wherein, $G_k(\beta)=f(l^{(k)}-\beta\Delta f(l^{(k)}))$.
By starting from two random initial value $\beta_0$ and $\beta_1$, and introducing $G'_k(\beta)$ as:

$$G'_k(\beta) = \frac{\partial}{\partial \beta} f(\lambda^{(k)} - \beta \nabla f(\lambda^{(k)})) \tag{11}$$

$$= 20\sum_{j=1}^{n} \phi_j \Theta_j \frac{\partial}{\partial \beta} \log(\|\lambda^{(k)} - \beta \nabla f(\lambda^{(k)}), b_j\|)$$

Similarly, as the one of the following conditions is satisfied, i.e. $|\beta_{t+1}-\beta_t|<\Delta\beta_{min}$ or $t=t_{max}$, the secant line search process is stopped. The $\Delta\beta_{min}$ and $t_{max}$ are predefined parameters.

The positioning module 110 feeds the convergence value of $\beta$ into the formula (5) so that it can evaluate whether the discriminant function $f$ is converged to its minimum and thus determine whether the random position 304, i.e. $\ell^{(k)}$, is the minimum convergence value. If not, the formula (7), formula (8), formula (9), formula (10), formula (11) are repeated taking the random position 304, i.e. $\ell^{(k)}$, as basis until a new $\Delta f(\ell^{(k+1)})$ and $\alpha_{k+1}$ are obtained and fed into the formula (5) for starting another recursive process and thus obtaining the final convergence value relating to the detected position 303, i.e. $\ell$. As soon as the final convergence value relating to the detected position 303, i.e. $\ell$, is obtained, the positioning of the signal receiver 200 by the positioning module 110 is completed.

Figure 5A:
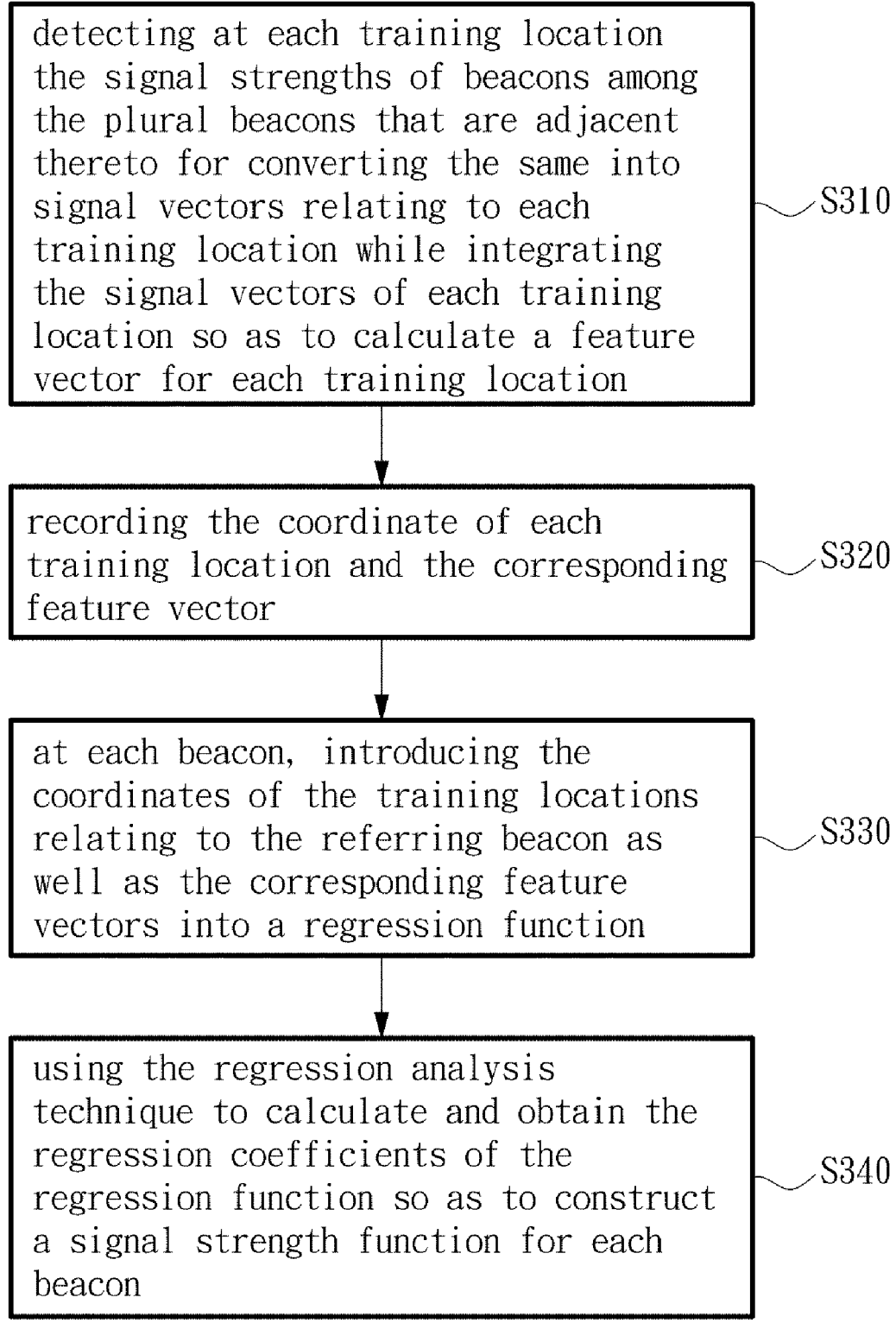
FIG. 5A is a flow chart depicting the steps of collecting and constructing training location data for a positioning method according to a second embodiment.

Please refer to FIG. 5A, which is a flow chart depicting the steps of collecting and constructing training location data for a positioning method according to a second embodiment. The method shown in FIG. 5A combines a linear regression process and a steepest descent search process and is adapted for the test signal space of FIG. 3. The foregoing method starts from the step S310.

At step S310, at each training location 302, the signal strengths of beacons 301 among the plural beacons 301 that are adjacent thereto are detected and converged into signal vectors relating to each training location 302; and then the signal vectors are integrated so as to calculate a feature vector for each training location 302; and then the flow proceeds to step S320. As the aforesaid step is similar to the step S120 shown in FIG. 4A, it is not described further herein.

At step S320, the coordinate of each training location 302 and the corresponding feature vector are recorded in the database configured in a positioning module; and then the flow proceeds to step S330.

At step S330, at each beacon, the coordinates of the training locations relating to the referring beacon as well as the corresponding feature vectors are introducing into a regression function; and then the flow proceeds to step S340. At step S340, a regression analysis technique is used to calculate and obtain the regression coefficients of the regression function so as to construct a signal strength function for each beacon. The regression function used in one embodiment is as following:

$$\sum_{p=0}^{r}\sum_{q=0}^{r} a_{p,q} x^p y^q \tag{12}$$

wherein,

⟨x,y⟩ is the coordinate of any location in the test signal space;

$a_{p,q}$, p=0, Λ, r, q=0, Λ, r is a unknown regression coefficient;

Accordingly, the signal strength function relating to the signal strength received at a random location l from the beacon $b_j$ can be represented as following:

$$P_r(\lambda, b_j) = \sum_{p=0}^{r} \sum_{q=0}^{r} a_{p,q} x^p y^q, \qquad (13)$$

wherein,

λ represents any location 304 in the test signal space;

$b_j$ represents the $j^{th}$ beacon as j=1, ..., n;

$a_{p,q}$ is the environment-related parameter of the beacon $b_j$ in the test signal space 300.

However, those environment-related parameters $a_{p,q}$ p=0, Λ, r, q=0, Λ, r are only supposed values that are defined for calculation and thus are unknown system parameters, so that they should be estimated in advance by using the data relating to the training locations 302.

By defining the optimal system parameter of the beacon $b_j$ as $x=[a_{0,0}^{(j)}, a_{1,0}^{(j)}, a_{0,1}^{(j)}, a_{1,1}^{(j)}]^T$, assuming r=1, for each training location 302 relating to the beacon $b_j$, the relationship between the corresponding feature vector and the coordinates is represented as following:

$$Ax = c;$$

$$A = \begin{bmatrix} 1 & x_1 & y_1 & x_1 y_1 \\ M & M & M & M \\ 1 & x_m & y_m & x_m y_m \end{bmatrix}$$

wherein $$x = \begin{bmatrix} a_{0,0}^{(j)} \\ a_{1,0}^{(j)} \\ a_{0,1}^{(j)} \\ a_{1,1}^{(j)} \end{bmatrix}$$

$$c = \begin{bmatrix} v_{1,j} \\ M \\ v_{m,j} \end{bmatrix}$$

Accordingly, a least-squares analysis is used for calculating the optimal solution for the regression coefficient x as following:

$$x=[a_{0,0}^{(j)}, a_{1,0}^{(j)}, a_{0,1}^{(j)}, a_{1,1}^{(j)}]^T = (A^T A)^{-1} A^T C. \qquad (14)$$

The so-obtained regression coefficient $x=[a_{0,0}^{(j)}, a_{1,0}^{(j)}, a_{0,1}^{(j)}, a_{1,1}^{(j)}]^T$ will minimize the difference between the signal strength predicted by the regression function with the actual feature vectors of the training locations so that the regression coefficient x can be considered as known system parameters by the positioning system. By introducing the optimal regression coefficient relating to each beacons 301 into the aforesaid regression function, the signal strength function relating to the signal strength received at a random location l from the beacon $b_j$ can be represented as the aforesaid formula (13), so that the collecting and constructing training location data, generally referring as the training phase, for a positioning method according to the second embodiment is completed.

Figure 5B:
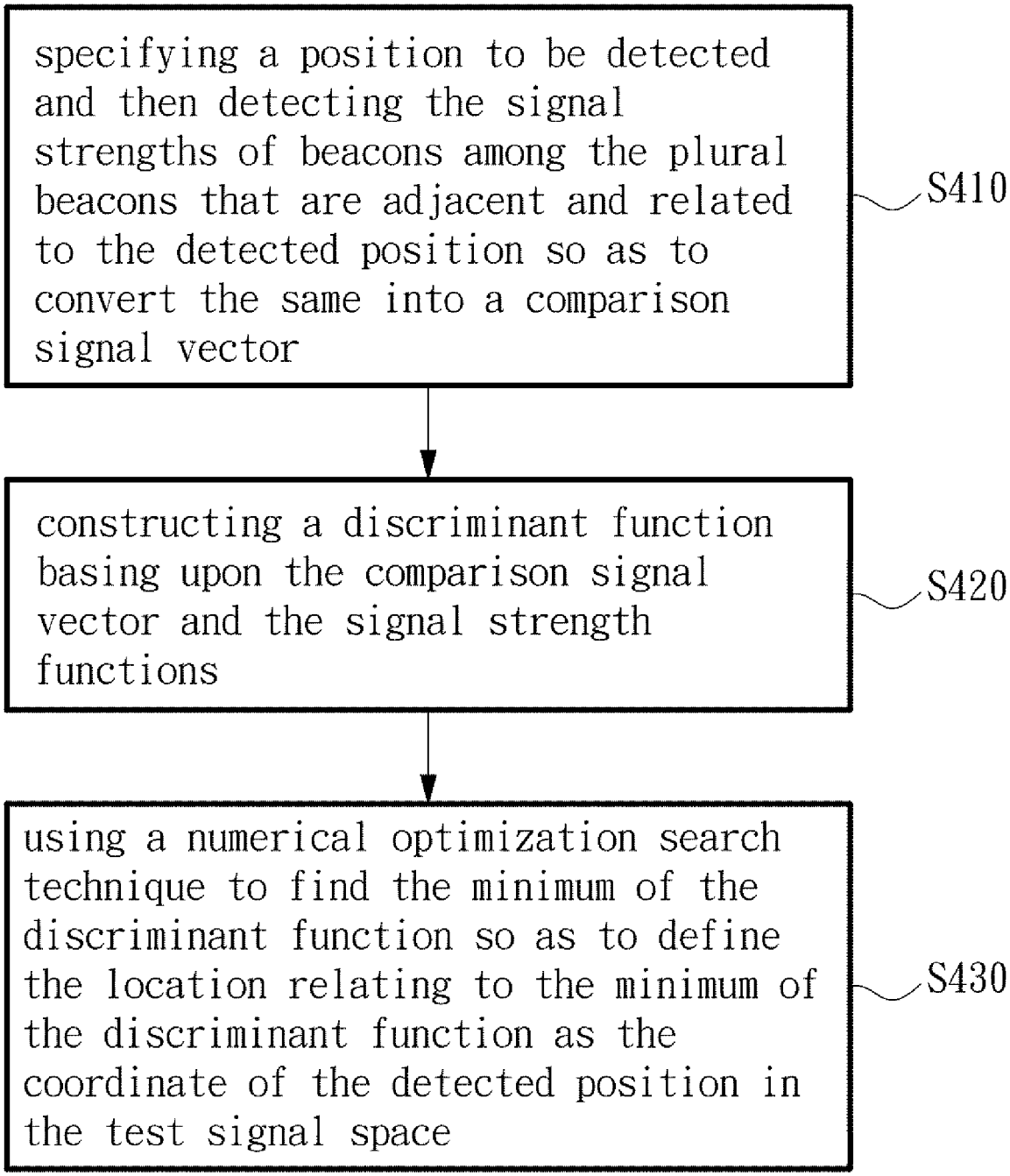
FIG. 5B is a flow chart depicting the steps of locating a test object for the positioning method of FIG. 5A.

Please refer to FIG. 5B, which is a flow chart depicting the steps of locating a test object for the positioning method of FIG. 5A. The localization process use the signal strength function of FIG. 5A to locate the position of the test object as the test object is the aforesaid signal detector 200. The flow of FIG. 5B starts from the step S410.

At step S410, a position to be detected 303 is specified at which the signal strengths of beacons 301 among the plural beacons 301 that are adjacent the detected position are detected and then converted into a comparison signal vector; and then the flow proceeds to step S420. In an embodiment, the signal detector 200 is placed at the detected position 303 in the test signal space 300 for enabling the same to receive signal from the adjacent beacons 301 while integrating the signal strength of the received signal into a comparison signal vector $s=[s_1, s_2, ..., s_n]$.

At step S420, a discriminant function is constructed basing upon the coordinates of the plural beacons, the comparison signal vector and the signal strength functions of the plural beacons; and then the flow proceeds to step S430. The discriminant function is represented as following:

$$f(s, \lambda) = \sum_{j=1}^{n} (s_j - P_r(\lambda, b_j))^2, \qquad (15)$$

in which

λ represents any location in the test signal space;

$s=[s_1, s_2, ..., s_n]$ is the comparison signal vector;

$b_j$ represents the $j^{th}$ beacon as j=1, ..., n;

$P_r(\lambda, b_j)$ is the signal strength function of the beacon $b_j$

At step S430, a numerical optimization search technique is used to find the minimum of the discriminant function $f$ so as to define the location relating to the minimum of the discriminant function $f$ as the coordinate of the detected position 303 in the test signal space 300. It is noted that the numerical optimization search technique used for searching the minimum of the discriminant function is a combined procedure of a steepest descent search process and a secant line search process.

The process of the step S430 is similar to that of the step S230 of FIG. 4B, but is different as those formulas described in the following:

$$\frac{\partial}{\partial x} f(\ell) = \sum_{j=1}^{n} (-2)(s_j - P_r(\ell, b_j)) \frac{\partial}{\partial x} P_r(\ell, b_j) \qquad (16)$$

$$= \sum_{j=1}^{n} (-2)(s_j - P_r(\ell, b_j)) \times \left( a_{1,0}^{(j)} + a_{1,1}^{(j)} y \right),$$

$$\frac{\partial}{\partial y} f(\ell) = \sum_{j=1}^{n} (-2)(s_j - P_r(\ell, b_j)) \frac{\partial}{\partial y} P_r(\ell, b_j) \qquad (17)$$

$$= \sum_{j=1}^{n} (-2)(s_j - P_r(\ell, b_j)) \times \left( a_{0,1}^{(j)} + a_{1,1}^{(j)} x \right),$$

-continued $$f(\ell - \beta \nabla f(s, \ell)) = \sum_{j=1}^{n} (s_j - P_r(\ell - \beta \nabla f(\ell), b_j))^2 \quad (18)$$

$$= \sum_{j=1}^{n} \left(s_j - \left(a_{0,0}^{(j)} + a_{1,0}^{(j)} \hat{x} + a_{0,1}^{(j)} \hat{y} + a_{1,1}^{(j)} \hat{x}\hat{y}\right)\right)^2,$$

$$= \sum_{j=1}^{n} \Theta_j^2.$$

wherein $$\hat{x} = x - \beta \frac{\partial}{\partial x} f(\ell) \text{ and } \hat{y} = y - \beta \frac{\partial}{\partial x} f(\ell)$$

$$G'_k(\beta) = \frac{\partial}{\partial \beta} f(\ell^{(k)} - \beta \nabla f(\ell^{(k)})) \quad (19)$$

$$= (-2) \sum_{j=1}^{n} \Theta_j \frac{\partial}{\partial \beta} P_r(\ell - \beta \nabla f(\ell), b_j)$$

$$= 2 \sum_{j=1}^{n} \Theta_j (F_{j,1} + F_{j,2} - F_{j,3}).$$

wherein $$F_{j,1} = \frac{\partial}{\partial x} f(\ell^{(k)}) \left(a_{1,0}^{(j)} + a_{1,1}^{(j)} y(k)\right)$$

$$F_{j,2} = \frac{\partial}{\partial y} f(\ell^{(k)}) \left(a_{0,1}^{(j)} + a_{1,1}^{(j)} x(k)\right)$$

$$F_{j,3} = 2\beta a_{1,1}^{(j)} \frac{\partial}{\partial x} f(\ell^{(k)}) \frac{\partial}{\partial y} f(\ell^{(k)})$$

The positioning module 110 feeds the convergence value of β into the formula (5) so that it can evaluate whether the discriminant function $f$ is converged to its minimum and thus determine whether the random position 304, i.e. $\ell^{(k)}$, is the minimum convergence value. If not, the formula (16), formula (17), formula (18), formula (10), formula (19) are repeated taking the random position 304, i.e. $\ell^{(k)}$, as basis until a new $\nabla f(\ell^{(k+1)})$ and $\alpha_{k+1}$ are obtained and fed into the formula (5) for starting another recursive process and thus obtaining the final convergence value relating to the detected position 303, i.e. $\ell$. As soon as the final convergence value relating to the detected position 303, i.e. $\ell$, is obtained, the positioning of the signal receiver 200 by the positioning module 110 is completed.

Please refer to FIG. 6A, which is a flow chart depicting the steps of collecting and constructing training location data for a positioning method according to a third embodiment. The method shown in FIG. 5A combines an inverse distance weighted interpolation process and a steepest descent search process and is adapted for the test signal space of FIG. 3. The foregoing method starts from the step S510. As the step S510 is similar to the step S120 of FIG. 4A, it is not described further herein. The flow then proceeds to step S520.

The positioning module 110 is used for constructing a gradient information by the formula: $\nabla P_r(\ell, b_j) = [\mathcal{G}_{i,j}^x, \mathcal{G}_{i,j}^y]^T$ for each training location 302, i.e. $\lambda_i$, according to other training locations adjacent to the referring training location 302. However, as the gradient information are only supposed values that that are defined for calculation and thus are unknown system parameters, so that they should be estimated in advance by the use of a constructed continuous plane and are represent as:

$$\mathcal{T}_{i,j}(\ell) = v_{i,j} + \mathcal{G}_{i,j}^x \times (x - x_i) + \mathcal{G}_{i,j}^y \times (y - y_i) \quad (20)$$

According to the referring training location 302, i.e. $\lambda_i$, and the group of adjacent training locations of amount ε, referring as $N_g(\lambda)$ as they are the training locations that will affect the constructed continuous plane $\mathcal{T}_{i,j}(\ell)$, the relationship between the corresponding feature vector and the coordinates is represented as following:

$$Ax = c;$$

in which $$\underbrace{\begin{bmatrix} x_1 - x_i & y_1 - y_i \\ \vdots & \vdots \\ x_\epsilon - x_i & y_\epsilon - y_i \end{bmatrix}}_{A} \times \underbrace{\begin{bmatrix} \mathcal{G}_{i,j}^x \\ \mathcal{G}_{i,j}^y \end{bmatrix}}_{x} = \underbrace{\begin{bmatrix} v_{1,j} - v_{i,j} \\ \vdots \\ v_{\epsilon,j} - v_{i,j} \end{bmatrix}}_{C}$$

accordingly, a least-squares analysis is used for calculating the coefficient x as following:

$$\nabla P_r(\lambda_i, b_j) = x = (A^T A)^{-1} A^T c$$

Then, the positioning system will define $\mathcal{G}_{i,j}^x$ and $\mathcal{G}_{i,j}^y$ as the gradient information for the training location 302, i.e. $\lambda_i$.

At step S520, the coordinate of each training location and its corresponding feature vector and the gradient information are recorded; and then the flow proceeds to step S530. At step S530, the positioning module 110 uses the coordinates of each training location and the corresponding feature vectors as well as the corresponding gradient information to construct a spatial-correlated data structure. Generally, the aforesaid data are stored in a R-tree structure as it can speed up the following positioning operation.

Moreover, as the interpolation process is characterized in that: the coefficients of its resulting signal strength function are not constant that they are changing dynamically according to different positions. Consequently, during the process of collecting and constructing training location data, there will be no unique signal strength function be generate, but they are produced dynamically in the positioning process.

Figure 6B:
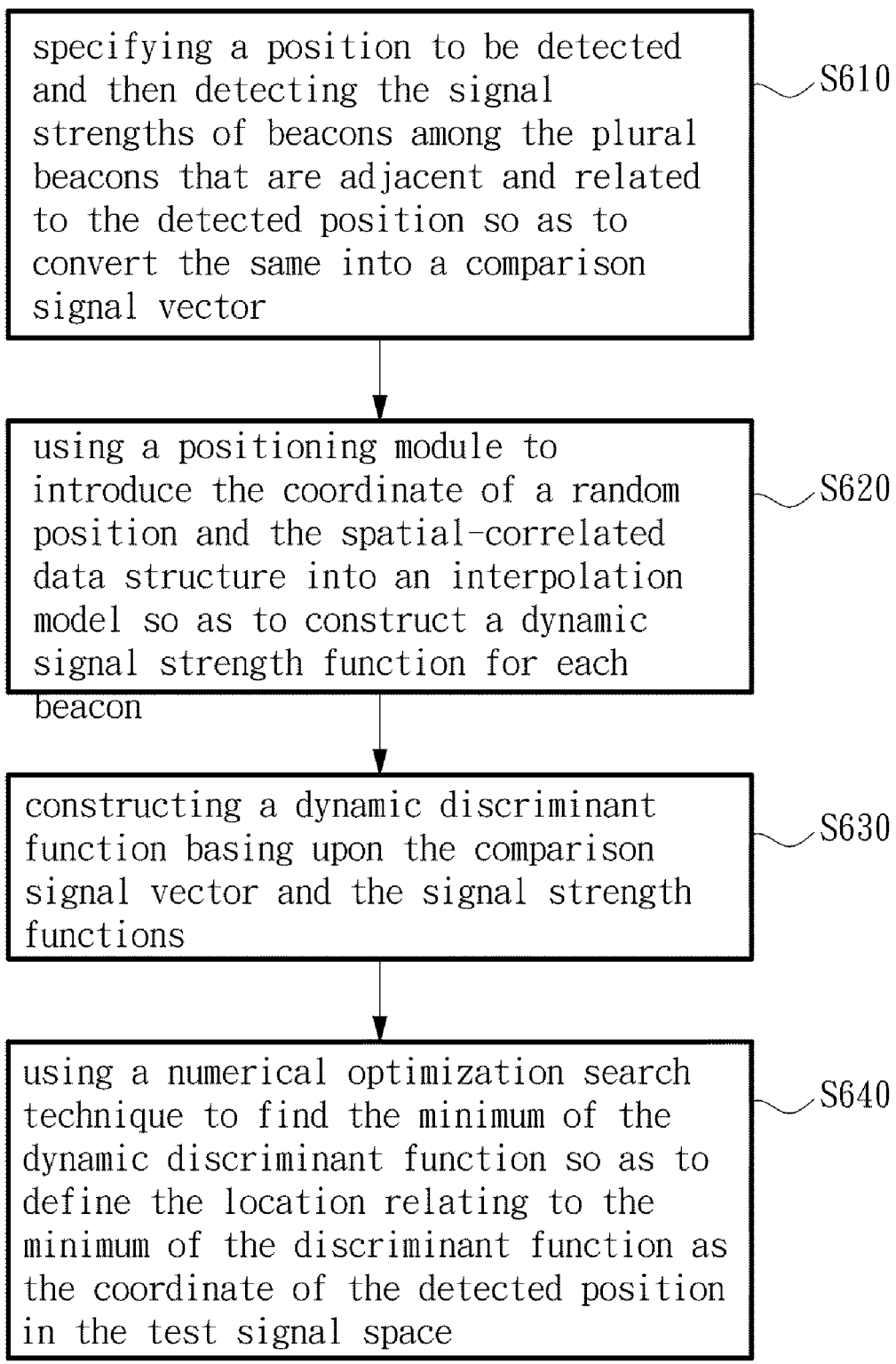
FIG. 6B is a flow chart depicting the exemplary steps of locating a test object for the positioning method of FIG. 6A.

Please refer to FIG. 6B, which is a flow chart depicting the steps of locating a test object for the positioning method of FIG. 6A. The flow starts from the step S610. At step S610, a position to be detected 303 is specified at which the signal strengths of beacons 301 among the plural beacons 301 that are adjacent the detected position are detected and then convert into a comparison signal vector; and then the flow proceeds to step S620. As the step S610 is similar to the step S210 of FIG. 4B, it is not described further herein.

At step S620, a positioning module 110 is used to introduce the coordinate of a random position and the spatial-correlated data structure into an interpolation model so as to construct a dynamic signal strength function for each beacon; and then the flow proceeds to step S630.

When an inverse distance weighted interpolation is used for predicting the signal strength of a random position 304, i.e. $\lambda_i$, the positioning module 110 will specify larger weights to those training locations 302 that are adjacent to the random position 304 while specifying smaller weight to those disposed farther from the random position 304 so that the closer the training locations is to the random position 304. the larger influence it will exerted on the random position 304. Accordingly, the signal strength function relating to the signal strength received at a random location l from the beacon $b_j$ can be represented as following:

$$P_r(\lambda, b) = \frac{1}{\sum_{l_i \in N_r(\lambda)} w_i} \times \sum_{l_i \in N_r(\lambda)} \tau_{i,j}(\lambda_i) \times w_i. \quad (21)$$

$$\text{in which, } w_i = \frac{1}{\|\lambda, \lambda_i\|^{\lambda}};$$

λ represents any location 304 in the test signal space;
$\lambda_i$ the training location 302;
λ is a system parameter in the position system and let λ=2,
$N_r(\lambda)$ represents the group of training locations.

With the aforesaid signal strength function, not only the continuity and differentiation of the interpolation model can be ensured, but also it is ensured that $P_r(\lambda_i, b_j) = v_{i,j}$ for all $\lambda_i \in L$. $N_r(\lambda)$ is group of training locations that include the T training locations are disposed near to the random location 304, i.e. λ. It is noted that the design of the $N_r(\lambda)$ is for improving the operation performance as it can limited the signal strength function $P_r(\lambda_i, b_j)$ to be affected by only a portion of the training locations in the test signal space. Therefore, in order to find the group of the training locations $N_r(\lambda)$ for the random location 304, i.e. λ, in a rapid manner, the R-tree data structure constructed in the training phase by the positioning module 101 can be very helpful as it can rapidly recognize the random location in its data structure and consequently identify the $N_r(\lambda)$ therefor.

At step S630, a dynamic discriminant function is constructed basing upon the comparison signal vector and the signal strength functions; and then the flow proceeds to step S640. The discriminant function is represented as following:

$$f(\lambda) = \sum_{j=1}^{n} (s_j - P_r(\lambda, b_j))^2 \quad (22)$$

in which
λ represents any location 304 in the test signal space;
$s = [s_1, s_2, \ldots, s_n]$ is the comparison signal vector;
$b_j$ represents the $j^{th}$ beacon as $j=1, \ldots, n$;
$P_r(\lambda, b_j)$ is the signal strength function of the beacon $b_j$ At Step S640, a numerical optimization search technique is used to find the minimum of the discriminant function $f$ so as to define the location relating to the minimum of the discriminant function $f$ as the coordinate of the detected position 303 in the test signal space 300. It is noted that the numerical optimization search technique used for searching the minimum of the discriminant function is a combined procedure of a steepest descent search process and a secant line search process.

Operationally, the positioning module 110 use a gradient descent search process to converge the discriminant function $f$ to its minimum. Moreover, the discriminant function $f$ is differentiate for finding the advance direction and the coordinate variables in relation to the random location 304, as described in the following:

$$\frac{\partial}{\partial x} f(l^{(k)}) = (-2) \sum_{j=1}^{n} (s_j - P_r(l^{(k)}, b_j)) \frac{\partial}{\partial x} P_r(l^{(k)}, b_j), \quad (23)$$

$$= (-2) \sum_{j=1}^{n} (s_j - P_r(l^{(k)}, b_j)) \frac{D_{j,1}^X D_{j,2}^X - D_{j,3}^X D_{j,4}^X}{D_{j,1}^X D_{j,1}^X},$$

-continued $$\frac{\partial}{\partial y} f(l^{(k)}) = (-2) \sum_{j=1}^{n} (s_j - P_r(l^{(k)}, b_j)) \frac{\partial}{\partial y} P_r(l^{(k)}, b_j), \quad (24)$$

$$= (-2) \sum_{j=1}^{n} (s_j - P_r(l^{(k)}, b_j)) \frac{D_{j,1}^Y D_{j,2}^Y - D_{j,3}^Y D_{j,4}^Y}{D_{j,1}^Y D_{j,1}^Y},$$

in which, $$D_{j,1}^X = D_{j,1}^Y = \sum_{l_i \in N_r(l^{(k)})} w_i,$$

$$D_{j,2}^X = \sum_{l_i \in N_r(l^{(k)})} \left( w_i \times \mathcal{G}_{i,j}^x + \mathcal{T}_{i,j}(l^{(k)}) \frac{\partial}{\partial x} w_i \right),$$

$$D_{j,2}^Y = \sum_{l_i \in N_r(l^{(k)})} \left( w_i \times \mathcal{G}_{i,j}^y + \mathcal{T}_{i,j}(l^{(k)}) \frac{\partial}{\partial y} w_i \right),$$

$$D_{j,3}^X = D_{j,3}^Y = \sum_{l_i \in N_r(l^{(k)})} \mathcal{T}_{i,j}(l^{(k)}) w_i,$$

$$D_{j,4}^X = \sum_{l_i \in N_r(l^{(k)})} \frac{\partial}{\partial x} w_i,$$

$$D_{j,4}^Y = \sum_{l_i \in N_r(l^{(k)})} \frac{\partial}{\partial y} w_i.$$

Thus, for calculating advance distances in the gradient search process, the positioning module 110 establishes the following formula:

$$f(l^{(k)} - \beta \nabla f(l^{(k)})) = \sum_{j=1}^{n} (s_j - P_r(l^{(k)} - \beta \nabla f(l^{(k)}), b_j))^2, \quad (25)$$

$$= \sum_{j=1}^{n} \left( \frac{s_j - \frac{1}{\sum_{l_i \in N_r(l^{(k)})} w_i} \sum_{l_i \in N_r(l^{(k)})} w_i \times}{\mathcal{T}_{i,j}(l^{(k)})} \right)^2,$$

$$= \sum_{j=1}^{n} \Theta_j^2,$$

in which, $$\hat{\lambda}^{(k)} = \lambda^{(k)} - \beta \nabla f(\lambda^{(k)}),$$

$$w_i = \frac{1}{\left\| \hat{\lambda}^{(k)} = \lambda^{(k)} - \beta \nabla f(\lambda^{(k)}), \lambda_i \right\|^{\lambda}}$$

For simplicity, the positioning module 110 uses the formula (10) according to a secant line search process and the recursive of $\hat{\lambda}^{(k)} = \lambda^{(k)} - \beta \Lambda f(\lambda^{(k)})$ to obtain the convergence of β as following:

$$G'_k(\beta) = \frac{\partial}{\partial \beta} f(\hat{l}^{(k)}) \quad (26)$$

$$= (-2) \sum_{j=1}^{n} \Theta_j \frac{\partial}{\partial \beta} P_r(\hat{l}^{(k)}, b_j),$$

$$= 2 \sum_{j=1}^{n} \Theta_j \frac{E_{j,2} E_{j,3} + E_{j,1}(E_{j,4} - E_{j,5})}{E_{j,1} E_{j,1}},$$

-continued in which, $$E_{j,1} = \sum_{\ell_i \in N_r(\hat{\ell}^{(k)})} w_i,$$

$$E_{j,2} = \sum_{\ell_i \in N_r(\hat{\ell}^{(k)})} w_i \times \mathcal{T}_{i,j}(\hat{\ell}^{(k)}),$$

$$E_{j,3} = \sum_{\ell_i \in N_r(\hat{\ell}^{(k)})} \frac{\partial}{\partial \beta} w_i,$$

$$E_{j,4} = \sum_{\ell_i \in N_r(\hat{\ell}^{(k)})} w_i \left( \mathcal{G}^x_{i,j} \frac{\partial}{\partial x} f(\hat{\ell}^{(k)}) + \mathcal{G}^y_{i,j} \frac{\partial}{\partial y} f(\hat{\ell}^{(k)}) \right),$$

$$E_{j,5} = \sum_{\ell_i \in N_r(\hat{\ell}^{(k)})} \mathcal{T}_{i,j}(\hat{\ell}^{(k)}) \frac{\partial}{\partial \beta} w_i.$$

Thereafter, the positioning module 110 inputs the convergence of β into the $\alpha_k$ in formula (5) so that it can evaluate whether the discriminant function $f$ is converged to its minimum. If not, another random position 304, i.e. $\lambda^{(k+1)}$, is specified for enabling the R-tree data structure to update the training location group for correspondingly and dynamically updating the signal strength functions for each beacon and the discriminant function $f$ and then the formula (23), formula (24), formula (25), formula (10), formula (26) are repeated taking the position 304, i.e. $\lambda^{(k+1)}$, as basis until obtaining the final convergence value relating to the detected position 303, i.e. $\ell$. As soon as the final convergence value relating to the detected position 303, i.e. $\ell$, is obtained, the positioning of the signal receiver 200 by the positioning module 110 is completed.

Figure 7:
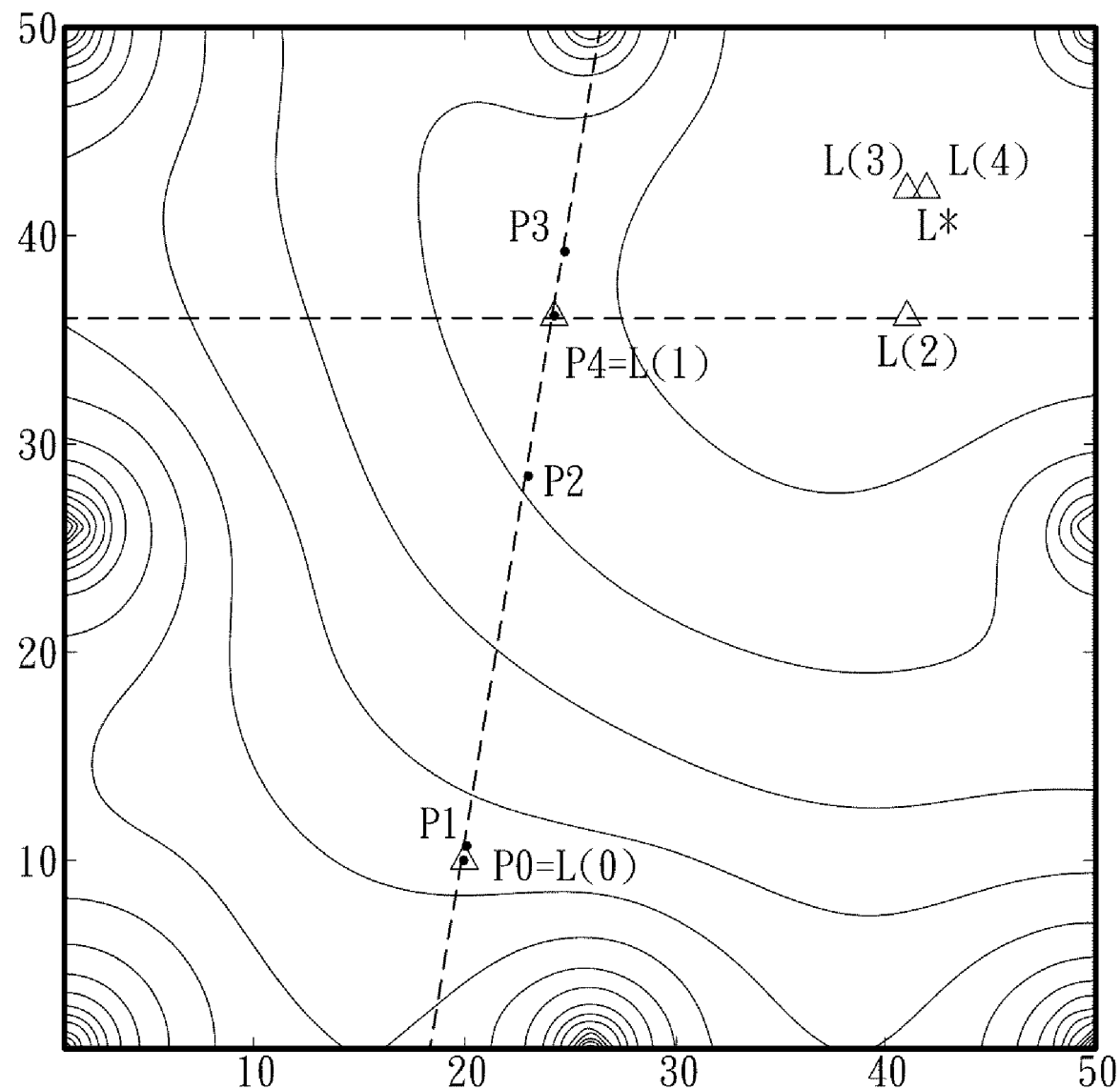
FIG. 7 is a schematic diagram showing the positioning result of a positioning module according to an embodiment.

Please refer to FIG. 7, which is a schematic diagram showing the positioning result of a positioning module according to an embodiment. In FIG. 7, the positioning module 110 will establish a discriminant function $f$ according to $P_r(\lambda,b_j)$ and s, and the consequence difference degrees are represented as contour lines while the minimum of the discriminant function $f$ is located at the position (42, 42). In this embodiment, the initial position of the search is located at the position $\lambda^{(0)}$=(20,10) and the positions located in each recursive, i.e. $\lambda^{(k)}$, k=1, ..., 4, are represented by "∇" in FIG. 7. Moreover, in the first recursive, the position located by the positioning module 110 according to the secant line search process is identified in the figure as a dot, representing $p_t = \lambda^{(0)} + \beta_t \times d^{(0)}$, t=0, ..., 4, and the direction of searching from the position of the first recursive to the second recursive is represented by the dotted line and the arrow.

In the first recursive, the positioning module 110 first randomly selected two positions as $p_0$ and $p_1$, so as to perform a secant line search process until achieving numerical convergence according to the aforesaid two positions $p_0$ and $p_1$. As seen in FIG. 7, the searching is directed to the top of the figure as shown by the dotted line for locating successively the following positions, $p_2$, $p_3$, and $p_4$. It is noted that, since $f(\lambda^{(0)} + \alpha_0 \times d^{(0)})$ is converged at the position p4, a gradient search process is used for obtaining $p_4 = 1^{(1)}$ and noted that $1^{(1)}$ is not the convergence in the referring gradient search process. Therefore, the positioning module once again initiates the secant line search process basing upon $p_4 = 1^{(1)}$ for numerical convergence in a recursive manner, by that $1^{(2)}$ is obtained and used in an evaluation for determining whether the gradient search process is converged at such. the aforesaid procedures are repeated until the convergence of the gradient search process is reached which is the position $1^{(4)}$ in FIG. 7 and it is also the minimum of the discriminant function $f$ that whose coordinate is designated as the coordinate of the detected position 303.

Figure 8A:
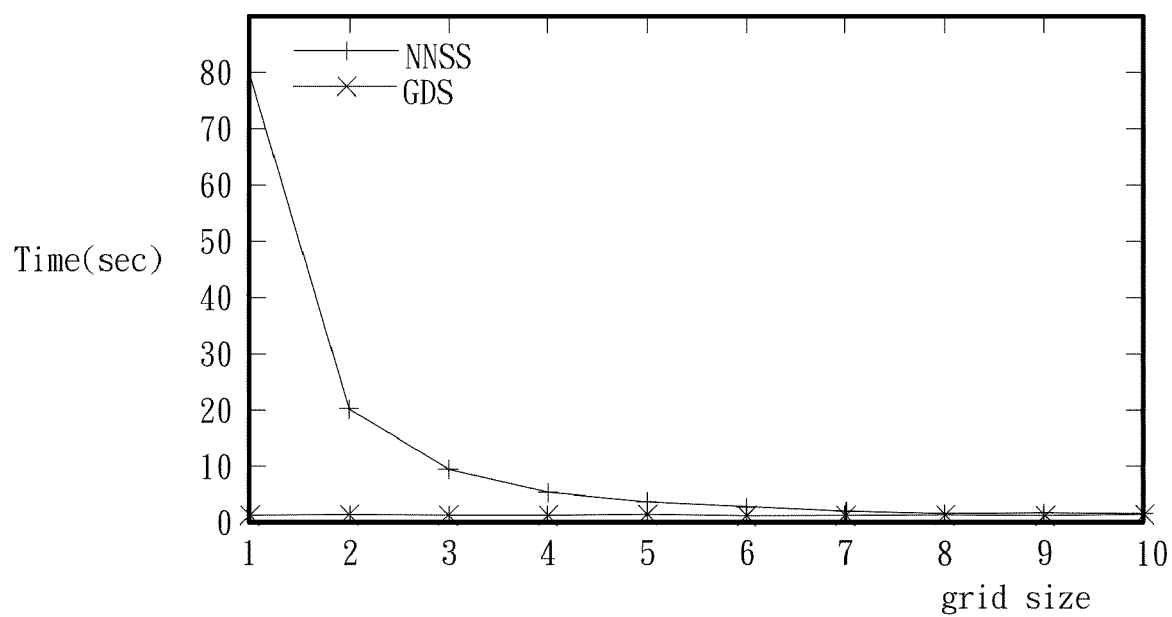
FIG. 8A and FIG. 8B compare the times required as well as the error rates of the exemplary embodiment of the positioning method as it is using the nearest neighbors signal strength search (NNSS) algorithm and the gradient descent search algorithm.
Figure 8B:
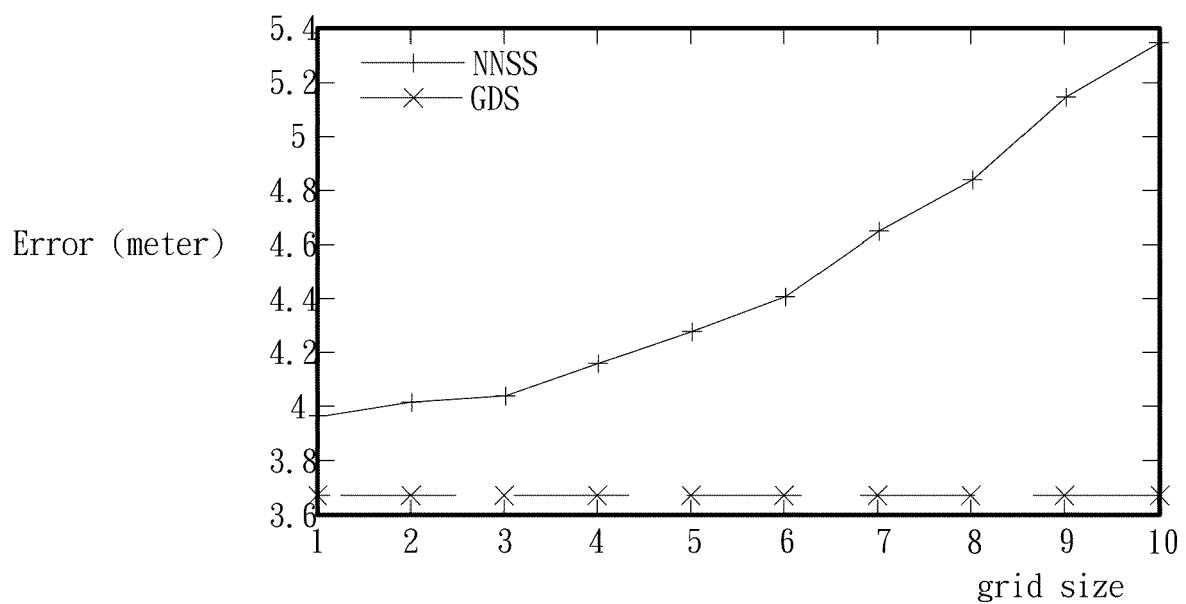

Please refer to FIG. 8A and FIG. 8B, which compare the times required as well as the error rates of the exemplary embodiment of the positioning method as it is using the nearest neighbors signal strength search (NNSS) algorithm and the gradient descent search (GDS) algorithm. First, a test signal space of 100×100 grid is defined for the comparison in which there are eight beacons located at the perimeter of the test signal space to be used as the signal source. Then, the features of training locations are collected as they are evenly distributed inside the test signal space. It is noted that the size of each grid in the test signal space is variable as the bigger the grid is, the lesser the amount of training location data is required to be collected.

As shown in FIG. 8A, after performing 10,000 times of positioning using the NNSS and the GDS algorithms, the time of positioning using the GDS algorithm is ranged between 1 second to 1.4 seconds while the time of positioning using the NNSS algorithm is about 80 seconds under the smallest possible grid as the positioning time of the NNSS algorithm can be significantly affected by the size of the grid. Thus, the positioning using GDS is about 60 times faster than that using the NNSS. However, the positioning time for the NNSS can be shortened when the size of the grid is increased but at the cost of reduced accuracy.

In FIG. 8B, the affect of accuracy from different grid sizes in relation to the GDS and the NNSS algorithms are disclosed. For the positioning using GDS algorithm, its accuracy will not be affected by the grid size since its training location features are converted into a discriminant function. However, the accuracy of positioning using the NNSS algorithm will be greatly affected as its error rate is increasing with the increasing of grid size. In conclusion, the larger the test signal space for positioning is, the more advantageous the position system using the GDS algorithm will be in both the positioning speed and the positioning accuracy, and such positioning system can be adapted for various test signal spaces.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the invention.

What is claimed is:

1. A method of collecting and constructing training location data in a positioning system, adapted for a test signal space having a plurality of beacons and a plurality of training locations, comprising:
    detecting at each training location the signal patterns of beacons among the plural beacons that are adjacent thereto for converting the same into signal vectors relating to each training location while integrating the signal vectors of each training location so as to calculate a feature vector for each training location;
    recording the coordinate of each training location and the corresponding feature vector;
    introducing the coordinate and the feature vector of each training location into a numerical data fitting model so as to construct a signal pattern function for each beacon representing the signal pattern distribution of each beacon in the test signal space;

specifying a position to be detected and then detecting the signal patterns of beacons among the plural beacons that are adjacent and related to the detected position so as to convert the same into a comparison signal vector;

constructing a discriminant function based on the comparison signal vector and the signal pattern functions of the plural beacons; and using a numerical optimization search technique to find the minimum of the discriminant function so as to define the location relating to the minimum of the discriminant function as the coordinate of the detected position in the test signal space.

2. The method of claim 1, wherein the signal pattern could be any observation which is changed with different locations, such as signal strengths, time of arrivals, and angle of arrivals.

3. The method of claim 1, wherein the numerical data fitting model is established by a path loss procedure.

4. The method of claim 1, wherein the numerical data fitting model is established by a regression procedure.

5. The method of claim 1, wherein the numerical data fitting model is established by an interpolation procedure.

6. The method of claim 1, wherein the numerical data fitting model is established by a combined calculation including procedures selected from the group consisting of: a path loss procedure, a regression procedure and an interpolation procedure.

7. The method of claim 1, wherein the numerical optimization search technique used for searching the minimum of the discriminant function is a gradient descent search procedure.

8. The method of claim 1, wherein the numerical optimization search technique used for searching the minimum of the discriminant function is a combined procedure of a steepest descent search process and a secant line search process.

9. A method of collecting and constructing training location data in a positioning system, adapted for a test signal space having a plurality of beacons and a plurality of training locations, comprising:

registering the coordinate of each beacon in the test signal space;

detecting at each training location the signal patterns of beacons among the plural beacons that are adjacent thereto for converting the same into signal vectors relating to each training location while integrating the signal vectors so as to calculate a feature vector for each training location;

recording the coordinate of each training location and the corresponding feature vector as well as the coordinates of the adjacent beacons;

at each beacon, introducing the coordinate of the referring beacon and the coordinates of the training locations relating thereto as well as the corresponding feature vectors into a path-loss model so as to use a numerical analysis technique to calculate and obtain optimal coefficients for the path-loss function so as to construct a signal pattern function for each beacon;

specifying a position to be detected and then detecting the signal patterns of beacons among the plural beacons that are adjacent and related to the detected position so as to convert the same into a comparison signal vector;

constructing a discriminant function based on the comparison signal vector and the signal pattern functions; and using a numerical optimization search technique to find the minimum of the discriminant function so as to define the location relating to the minimum of the discriminant function as the coordinate of the detected position in the test signal space.

10. The method of claim 9, wherein the signal pattern could be any observation which is changed with different locations, such as signal strengths, time of arrivals, and angle of arrivals.

11. The method of claim 9, wherein the path-loss model is represented by the following function:

$$PL(d) = PL(d_0) + 10\phi \log\left(\frac{d}{d_0}\right);$$

in which, d is the distance between the beacon and the training location that are introduced into the path-loss model;

$d_0$ is a reference distance unit; and $\phi$ is an environment variable.

12. The method of claim 9, wherein the signal pattern function is represented as:

$$P_r(l,b_j) = P_t - PL(\|l,b_j\|) = P_{ref} - 10\phi \log(\|l,b_j\|);$$

in which, $b_j$ represents the $j^{th}$ beacon as j=1..., n;

l represents any location in the test signal space;

$P_t$ represents the initial signal pattern of a beacon;

$P_{ref} = P_t - PL(d_0)$ represents a reference signal pattern;

($\|l,b_j\|$) is the Euclidean Distance measured between the location l and the beacon $b_j$; and $\phi$ and $P_{ref}$ are system parameters in the test signal space.

13. The method of claim 12, wherein, for the beacon $b_j$, the relationship between the corresponding feature vectors and coordinates is represented as following:

$$Ax=c;$$

$$Ax = c;$$

$$A = \begin{bmatrix} 1 & -10\log(\|l_1, b_j\|) \\ M & M \\ 1 & -10\log(\|l_m, b_j\|) \end{bmatrix}$$

in which $$x = \begin{bmatrix} P_{ref}^j \\ \phi_j \end{bmatrix}$$

$$c = \begin{bmatrix} v_{1,j} \\ M \\ v_{m,j} \end{bmatrix}$$

accordingly, a least-squares analysis is used for calculating the optimal coefficient relating to the beacon $b_j$ as following:

$$x=[P_{ref}^j,\phi_j]^T=(A^TA)^{-1}A^TC.$$

14. The method of claim 9, wherein the numerical optimization search technique used for searching the minimum of the discriminant function is a gradient descent search procedure.

15. The method of claim 9, wherein the numerical optimization search technique used for searching the minimum of the discriminant function is a combined procedure of a steepest descent search process and a secant line search process.

16. The method of claim 9, wherein the discriminant function is represented as following:

$$f(s, \lambda) = \sum_{j=1}^{n} (s_j - P_r(\lambda, b_j))^2;$$

in which, l represents any location in the test signal space;
s=[$s_1$, $s_2$, ..., $s_n$] is the comparison signal vector;
$b_j$ represents the $j^{th}$ beacon as j=1, ..., n;
$P_r(l,b_j)$ is the signal pattern function of the beacon $b_j$.

17. A method of collecting and constructing training location data in a positioning system, adapted for a test signal space having a plurality of beacons and a plurality of training locations, comprising:

detecting at each training location the signal patterns of beacons among the plural beacons that are adjacent thereto for converting the same into signal vectors relating to each training location while integrating the signal vectors of each training location so as to calculate a feature vector for each training location;

recording the coordinate of each training location and the corresponding feature vector;

at each beacon, introducing the coordinates of the training locations relating to the referring beacon as well as the corresponding feature vectors into a regression function so as to use a regression analysis technique to calculate and obtain the regression coefficients of the regression function so as to construct a signal pattern function for each beacon;

specifying a position to be detected and then detecting the signal patterns of beacons among the plural beacons that are adjacent and related to the detected position so as to convert the same into a comparison signal vector;

constructing a discriminant function based on the comparison signal vector and the signal pattern functions; and using a numerical optimization search technique to find the minimum of the discriminant function so as to define the location relating to the minimum of the discriminant function as the coordinate of the detected position in the test signal space.

18. The method of claim 17, wherein the signal pattern could be any observation which is changed with different locations, such as signal strengths, time of arrivals, and angle of arrivals.

19. The method of claim 17, wherein the regression function is represented as following:

$$\sum_{p=0}^{r} \sum_{q=0}^{r} a_{p,q} x^p y^q;$$

in which, ⟨x, y⟩ is the coordinate of any location in the test signal space;
$a_{p,q}$, p=0, ..., r, q=0, ..., r is a regression coefficient;
r is a system parameter of the positioning system.

20. The method of claim 19, wherein for the beacon $b_j$, the relationship between the corresponding feature vectors and coordinates is represented as following:

$$\underbrace{\begin{bmatrix} 1 & x_1 & y_1 & x_1 y_1 & \cdots \\ \vdots & \vdots & \vdots & \vdots & \vdots \\ 1 & x_m & y_m & x_m y_m & \cdots \end{bmatrix}}_{A} \times \underbrace{\begin{bmatrix} a_{0,0}^{(j)} \\ a_{1,0}^{(j)} \\ a_{0,1}^{(j)} \\ a_{1,1}^{(j)} \\ \vdots \end{bmatrix}}_{x} = \underbrace{\begin{bmatrix} v_{1,j} \\ \vdots \\ v_{m,j} \end{bmatrix}}_{C};$$

accordingly, a least-squares analysis is used for calculating the optimal regression coefficients relating to the beacon $b_j$ as following:

$$x=[a_{0,0}^{(j)}, a_{1,0}^{(j)}, a_{0,1}^{(j)}, a_{1,1}^{(j)}, \ldots]^T = (A^T A)^{-1} A^T C.$$

21. The method of claim 17, wherein the numerical optimization search technique used for searching the minimum of the discriminant function is a gradient descent search procedure.

22. The method of claim 17, wherein the numerical optimization search technique used for searching the minimum of the discriminant function is a combined procedure of a steepest descent search process and a secant line search process.

23. The method of claim 17, wherein the discriminant function is represented as following:

$$f(s, \lambda) = \sum_{j=1}^{n} (s_j - P_r(\lambda, b_j))^2;$$

in which, l represents any location in the test signal space;
s=[$s_1$, $s_2$, ..., $s_n$] is the comparison signal vector;
$b_j$ represents the $j^{th}$ beacon as j=1, ..., n;
$P_r(l,b_j)$ is the signal pattern function of the beacon $b_j$.

24. A method of collecting and constructing training location data in a positioning system, adapted for a test signal space having a plurality of beacons and a plurality of training locations, comprising:

detecting at each training location the signal patterns of beacons among the plural beacons that are adjacent thereto for converting the same into signal vectors relating to each training location while integrating the signal vectors of each training location so as to calculate a feature vector for each training location;

estimating a gradient information for each training location;

using the coordinates of each training location and the corresponding feature vectors as well as the corresponding gradient information to construct a spatial-correlated data structure for storing information to be used by an interpolation procedure;

specifying a position to be detected and then detecting the signal patterns of beacons among the plural beacons that are adjacent and related to the detected position so as to convert the same into a comparison signal vector;

selecting a random location in the test signal space and search the spatial-correlated data structure to obtain a subset of training locations that will be used by an interpolation procedure;

introducing the information and the feature vector corresponding to the group of training locations into an interpolation model so as to construct a dynamic signal pattern function for each beacon;

constructing a dynamic discriminant function based on the comparison signal vector and the derived dynamic signal pattern functions; and using a numerical optimization search technique to find the minimum of the dynamic discriminant function so as to define the location relating to the minimum of the discriminant function as the coordinate of the detected position in the test signal space.

25. The method of claim 24, wherein the signal pattern could be any observation which is changed with different locations, such as signal strengths, time of arrivals, and angle of arrivals.

26. The method of claim 24, wherein, for each training location, the relationship between the corresponding feature vector and the gradient information is represented as following:

$$Ax = c;$$

$$A = \begin{bmatrix} x_i - x_1, y_i - y_1 \\ x_i - x_2, y_i - y_2 \\ \vdots \\ x_i - x_\epsilon, y_i - y_\epsilon \end{bmatrix},$$

$$x = \begin{bmatrix} G_{i,j}^x \\ G_{i,j}^y \end{bmatrix},$$

$$c = \begin{bmatrix} v_{i,j} - v_{1,j} \\ v_{i,j} - v_{2,j} \\ \vdots \\ v_{i,j} - v_{\epsilon,j} \end{bmatrix}.$$

accordingly, a least-squares analysis is used for calculating the gradient information as following:

$$\nabla P_r(l_i, b_j) = x = (A^T A)^{-1} A^T c;$$

in which, $N_g$ (l) of size $\epsilon$ is a group of training locations capable of affecting the computation of the gradient information.

27. The method of claim 24, wherein the spatial-correlated data structure is an R-tree data structure.

28. The method of claim 24, wherein the interpolation model is an inverse distance weighted interpolation model, representing as following:

$$P_r(\lambda, b) = \frac{1}{\sum_{l_i \in N_r(\lambda)} w_i} \times \sum_{l_i \in N_r(\lambda)} T_{i,j}(\lambda_i) \times w_i$$

in which, $w_i = \dfrac{1}{\|\lambda, \lambda_i\|^\lambda}$;

l represents any location in the test signal space;

$T_{i,j}(l) = v_{i,j} + G_{i,j}^x \times (x - x_i + G_{i,j}^y + (y - y_i);$ the gradient information of each training location is represented as $\nabla P_r(l, b_j) = [G_{i,j}^x, G_{i,j}^y]^T$; and $N_r$ (l) represents a subset of training locations which are capable of affecting the computation of the interpolation model.

29. The method of claim 24, wherein the numerical optimization search technique used for searching the minimum of the discriminant function is a gradient descent search procedure.

30. The method of claim 24, wherein the numerical optimization search technique used for searching the minimum of the discriminant function is a combined procedure of a steepest descent search process and a secant line search process.

31. The method of claim 24, wherein the discriminant function is represented as following:

$$f(s, \lambda) = \sum_{j=1}^{n} (s_j - P_r(\lambda, b_j))^2;$$

in which, l represents any location in the test signal space;
s=[$s_1, s_2, \ldots, s_n$] is the comparison signal vector;
$b_j$ represents the $j^{th}$ beacon as j=1, ..., n;
$P_r$ (l,$b_j$) is the signal pattern function of the beacon $b_j$.

* * * * *